United States Patent [15] 3,679,818
Courtney-Pratt [45] July 25, 1972

[54] METHOD AND MEDIUM FOR PRODUCING COLOR IMAGES

[72] Inventor: Jeofry Stuart Courtney-Pratt, Locust, N.J.

[73] Assignee: Bell Telephone Laboratories, Incorporated, Murray Hill, N.J.

[22] Filed: April 23, 1971

[21] Appl. No.: 136,849

[52] U.S. Cl. ....................... 178/5.4 CD, 178/6.6 B, 346/76 L
[51] Int. Cl. ........................................ H04n 9/02, H04n 5/76
[58] Field of Search .................... 178/5.2, 5.4, 5.4 CD, 6.6 B; 346/76 L; 350/162 SF

[56] References Cited

UNITED STATES PATENTS 3,181,170 4/1965 Akin .................................. 178/6.6 B
3,351,948 11/1967 Bonn .................................. 346/76 L
3,474,457 10/1969 Becker ................................ 346/76 L
3,527,879 9/1970 Pritchard .............................. 178/5.4

*Primary Examiner*—Richard Murray
*Attorney*—R. J. Guenther and Edwin B. Cave

[57] ABSTRACT

A film with a repeating color filter dot pattern on one side and an opaque coating such as bismuth metal on the other side, serves as a medium for reproducing color transparencies. Laser light having the same frequency as the dot color is directed through those dots constituting the desired image. The metallic coating behind each such dot is thereby evaporated, leaving the dot color unaffected. Illumination from the metal side produces the desired projected image. The image may also be viewed in reflected light by placing the film against a white background sheet.

7 Claims, 6 Drawing Figures

INVENTOR
J. S. COURTNEY-PRATT
BY Charles E. Graves
ATTORNEY

METHOD AND MEDIUM FOR PRODUCING COLOR IMAGES

FIELD OF THE INVENTION

This invention relates to formation of images in a medium, and specifically to a method of producing color transparencies.

BACKGROUND OF THE INVENTION

In radio and telephonic communications, numerous facsimile systems exist for reproducing an image transmitted from a remote location. Typically, the reproduced copy is an opaque image in black and white, with grey scale, and viewable in reflected light.

With video telephone communications a prospect of the near future, its inherent potential as a facsimile system is commanding increased attention. In particular, a practical sYstem is being sought for reproducing color images at a video telephone station.

Accordingly, the principal object of the invention is to achieve a practical color graphics mode for a communications system.

Another object of the invention is to realize, in such a system, an acceptable level of color highlights.

A further object of the invention is to devise a medium which requires no developing or additional processing after being once contacted by a scanning beam.

SUMMARY OF THE INVENTION

The inventive medium consists of a transparent substrate, such as a film, coated on one side with a closely spaced, repeating pattern of transparent color filter dots. The reverse side is backed with a thin, optically opaque layer, capable of being selectively removed by applied laser energy.

In one embodiment, plural laser beams—each corresponding in center frequency to the midband frequency of one of the dot colors—are directed through the color dot side of the medium, by a scan control. In a further embodiment, a single laser beam is directed from the back side of the film onto selected regions of the opaque layer.

A color image transparency is produced by the multibeam method, by subjecting those color dots which constitute the desired color image, to laser beams corresponding respectively in center frequency to the frequency of those dots. No dots are removed or affected by this laser scan. The beams have sufficient energy—however, to evaporate or burn off the opaque layer behind the dots through which each beam is directed, leaving the coating undisturbed elsewhere. Thus, by illuminating the sheet from either side with white light, the desired color image may be projected.

Alternatively, a single laser beam may be used to burn off the opaque material behind those dots constituting the image transparency, by direct application of the beam to the material.

Advantageously the color filter dot patterns consist of closely packed hexagonal-shaped arrays of three selected colors—for example, green, red, and blue. The opaque layer advantageously comprises a thin metallic coating on the back side of the film, such as, for example, evaporated bismuth, indium, chromium, or cadmium; or a deposited carbon layer.

In one embodiment of the invention, a scanning head at a remote video telephone location scans a color copy to be transmitted. The scanning rate is dependent upon the resolution desired, up to a resolution corresponding to the dot-spacing on the film. The color information may be stored in a buffer and then transmitted, for example, digitally at high frequency through a telephone link usually including a central office, to the station where the image is to be reproduced. There, the image data may be stored in a second buffer. Readout may be automatic on receipt of the incoming signal, or delayed. Alternatively, buffer stores may be unnecessary. In any case, when copy is desired, a control-and-logic unit directs a laser scanner in accordance with either the directly received scanning instructions, or the buffer contents.

The invention and its further objects, features, and advantages will be readily apprehended from a reading of the description to follow of an illustrative embodiment.

DETAILED DESCRIPTION OF ILLUSTRATIVE EMBODIMENT

Figures 1, 2, 3, 4, 6:
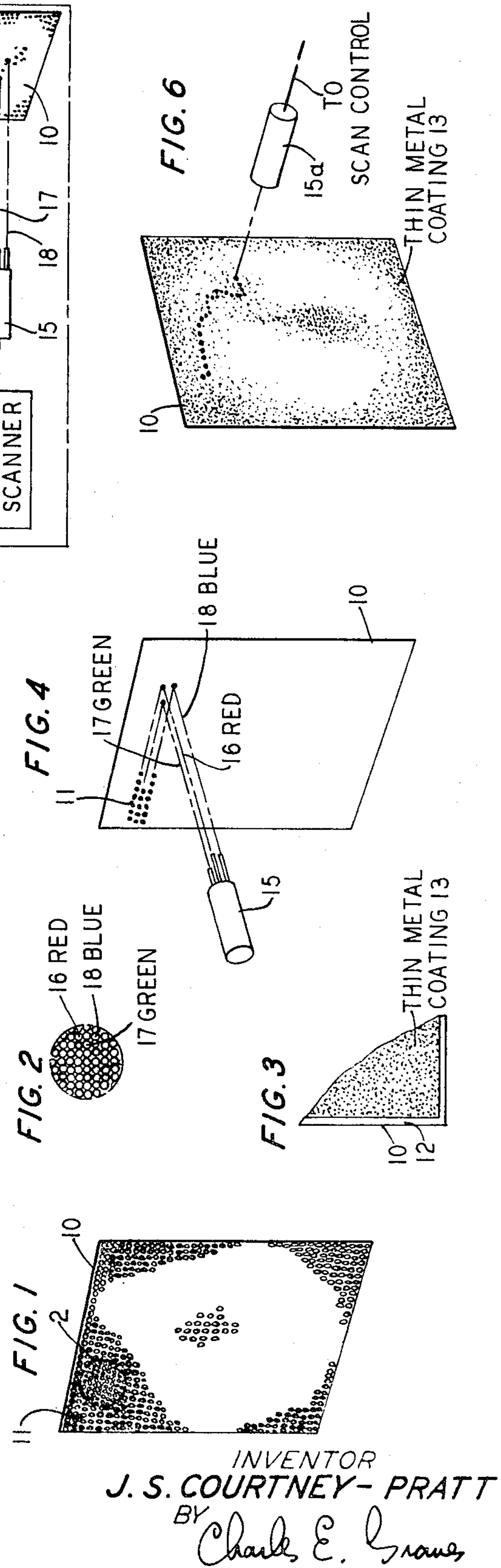
FIG. 1 is a schematic perspective diagram of the medium.
FIG. 2 is an enlarged view of a portion of FIG. 1, showing a color filter dot pattern.
FIG. 3 is a schematic perspective diagram of the inventive medium as seen from the reverse side.
FIG. 4 is a frontal perspective view of a multibeam printing system for operation on the medium.
FIG. 6 is a frontal perspective view of a single beam printing system.

As shown in FIG. 1, a film substrate 10 is coated with a pattern 11 of circular transparent dots, placed in a selected repeating geometric configuration such as a square array. The dots are gelatinous and transparent. The dot colors advantageously are red, green, and blue, as shown in FIG. 2. The dots are all approximately 0.010 or less inch in diameter; and each is either closely adjacent to, or touching, its neighbors, although not overlapping them. Other dot color schemes include vertical stripes, horizontal stripes, diagonal stripes and corresponding stripes of dots.

The dots may be produced by any standard printing or photographic process; or any of the suitable methods described in History of Color Photography, J. S. Friedman, American Photographic Publishing Company (1944) Chapter 13.

Other possible arrangements of dots include triangular arrays. It is important in general to maintain a highly accurate dot-spacing throughout the sheet. The spacing accuracy required and dot diameter are dependent on the desired resolution. Accurate dot-spacing center-to-center to within 1 mil is readily achieved in the art.

The reverse side 12 of film 10, shown in FIG. 3, is coated with a thin layer 13 approximately 500 A units thick of a metal such as bismuth which may readily be locally removed by the application of a fine but intense energy beam such as a laser, for example. In addition, the metal film is of low reflectivity, and adherable to a "Mylar" or other suitable substrate material.

The color dots are made of gelatinous material that, for each given color, readily passes concentrated, hlgh intenslty light of the same frequency as the dot, without alteration of the gelatin.

A color transparency is produced by removing the metal backing behind all dots which are intended to contribute to the image, while leaving the metal backing intact behind those dots which are not to contribute. This may be achieved with the basic mechanism depicted in FIG. 4. A source 15 of separate laser beams 16, 17, 18 each corresponding in center frequency to a one of the three basic colors present in the dot pattern, is placed before the sheet 10. By standard routines, a reference position for each beam with respect to the location of all dots on the sheet 10 is established.

The contribution of each color component is adjusted using only the corresponding frequency scanning beam operated at a level sufficiently intense to evaporate the metal coating. The beam is directed through the appropriate overlying color filter dot, without affecting its color or transparency. Thus, red beam 16, for example, is directed through all red color dots intended to contribute to the image and in so doing, removes the opaque layer underlying each. A similar operation is performed on the opaque layer by the green beam 17 through the wanted green dots and by the blue beam 18 through the wanted blue dots. In this fashion, the metal film underlying all dots which are to contribute to the image, is removed. Illumination of the film 10 from either side results in a projection of the desired image.

Alternatively, as suggested in FIG. 6 a single laser **15*a* may be employed to selectively and locally remove those regions of the opaque layer 13 behind the dots which are to constitute the desired image. Laser 15*a* in this embodiment is applied directly to the opaque layer 13, onto prescribed local regions. As in the earlier case, laser 15a** derives its signal from a scan control. While close alignment of the scannlng beam with respect to the dot field is required, the advantages of using a single laser beam are offset.

In a further embodiment of the invention, a hard copy image to be viewed in reflected light may also be realized. This is achieved in general by removing all color dots which are not intended to contribute to the final image, while leaving the entire reverse side metal coating 13 intact. To adjust the red tone of the sheet 10 in this embodiment, the red color dots are evaporated or burned off by shinlng the green or the blue laser beam into selected ones of the red dots. Similarly, the green tone is adjusted by shining into selected ones of the green dots either the blue or red beams; and the blue tone adjusted by shining into selected blue dots either the red or the green beams. Tones of green, orange, purple, brown, etc. are obtainable. The beams are maintained at intensities sufficiently low to avoid evaporating the metal film beneath the dots scanned. Numerous dyed gelatines are available that will be affected at beam intensities well below those required for evaporation of the metal coating.

If the opaque layer is made of a nonreflecting substance such as carbon, the medium has the same capabilities as the color image transparency already described; but in addition, may be viewed in reflected light if a high reflectivity backing sheet is used. Black is achieved by not removing the carbon coating in the region which is to appear black. White is achieved by removing the carbon from behind those dot clusters which are to appear white, while leaving the dots intact. The color red, for example, is produced by removing the carbon from behind the red dots which make up the red portion of the image. The high reflectivity backing sheet provides retransmission of incident light back through any dots behind which the carbon has been removed. The backing sheet may for example, be a sheet of white paper or plastic; or a sheet of translucent plastic or glass illuminated from behind with white light.

Figure 5:
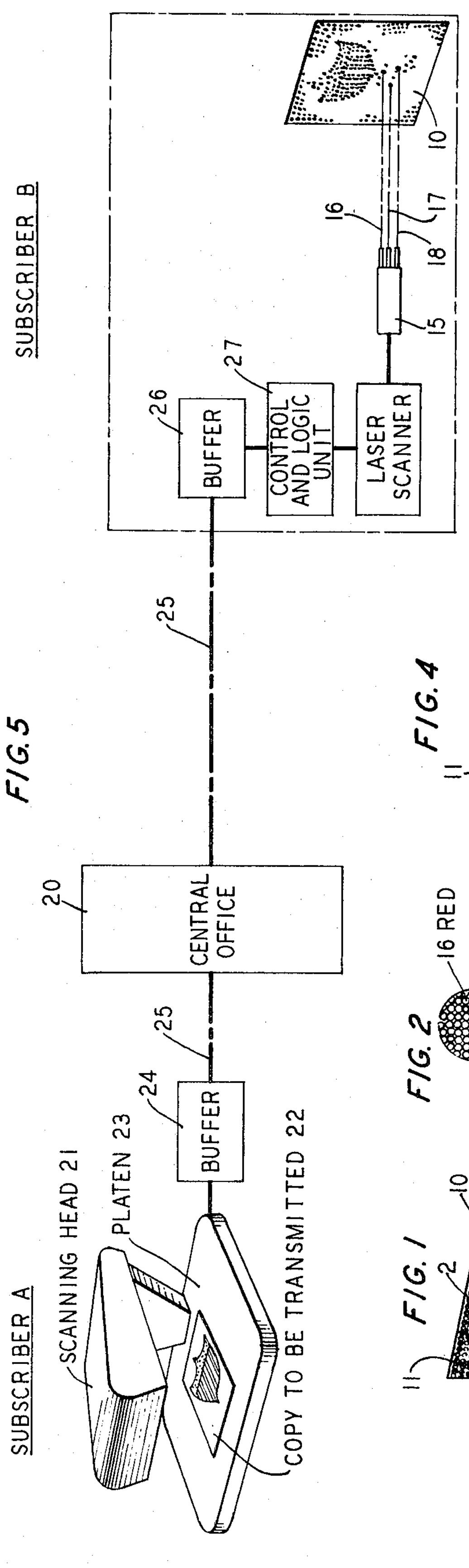
FIG. 5 is a communications system embodying the invention.

A transmission system utilizing the invention is illustrated in FIG. 5 by way of a connection between two telephone subscribers A and B through a central office 20. Subscriber A at the transmitting end has a scanning head 21. A color copy 22 to be transmitted is placed on a platen 23 beneath the head 21. The scanning head may, for example be a vidicon tube, or other device that senses color and intensity as a function of position in a defined plane before it. As much detail as required for definition may be gathered by the head 21. If this requires a slow scan, the information may be stored digitally as, for example, in buffer 24 for later transmission at a high data rate through link 25, the central office 20, and to subscriber B.

A second buffer store 26, receives at a high data rate the color information, which is instantly available or alternatively which may be accessed at a later convenient time. A control-and-logic function 27 receives inputs from the buffer store 26; and in the manner described above, controls the beams 16, 17, 18 of laser 15 to reproduce either a color transparency of the copy 22, or a replica thereof to be viewed in reflected light.

It is to be understood that the embodiments described herein are merely illustrative of the principles of the invention. Various modifications may be made thereto by persons skilled in the art without departing from the spirit and scope of the invention.

What is claimed is:

1. A system for producing a color image of an object, comprising:

a medium comprising
- a transparent film;
- on one side of said film, a repeating pattern of substantially identical color dot clusters, each consisting of a like plurality of complementary color dots;
- on the reverse side of said film, a thin opaque coating capable of being locally removed by an incident optical beam;

an optical beam-producing means; and means responsive to receipt of data corresponding to the color elements of a color object, for directing at least one said optical beam onto said film at any selected region the size of one of said color dots or smaller, each said beam having sufficient energy to alter the optical characteristics of said medium thereby to produce a replica of said color object.

2. A system pursuant to claim 1, wherein said coating is reflective and metallic, and wherein said optical beam-producing means comprises plural laser beams each corresponding in center frequency to a one of the colors of said color dots, said beams being mounted on the color dot side of said film, the energy level of each said beam being lower than that required to alter the color filter dots of a corresponding frequency but high enough to remove said metallic coating behind a dot of said corresponding frequency.

3. A system pursuant to claim 2, wherein said coating comprises an evaporated layer of bismuth.

4. A system pursuant to claim 1, wherein said opaque coating is nonreflective; wherein said optical beam-producing means comprises a single laser beam mounted on the opaque coating side of said film and having sufficient intensity to remove said coating; and wherein said beam-directing means directs said beam onto regions behind all color dots which correspond to said color elements, thereby removing in said regions said opaque coating.

5. A system pursuant to claim 4, wherein said coating is carbon.

6. A system pursuant to claim 4, further comprising a reflective backing sheet disposed on the opaque coating side of said medium, thereby permitting an image produced in said medium to be viewed in reflected light.

7. A system pursuant to claim 1, wherein the color in each said dot is capable of being removed by an incident optical beam of a different frequency than the said dot.

* * * * *